Dec. 2, 1958  C. BIRDSEYE  2,862,814
UTILIZATION OF PITH IN THE MANUFACTURE OF PULP
Filed March 9, 1955
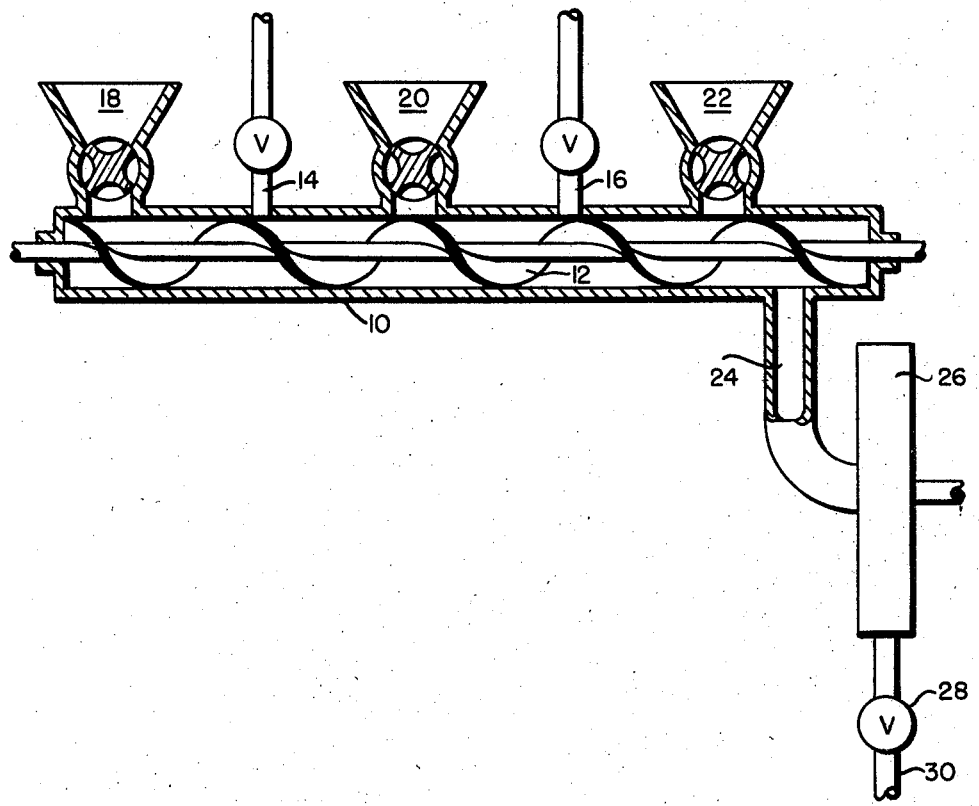
INVENTOR.
Clarence Birdseye
BY

2,862,814

UTILIZATION OF PITH IN THE MANUFACTURE OF PULP

Clarence Birdseye, Gloucester, Mass., assignor to Process Evaluation and Development Corporation, New York, N. Y., a corporation of Delaware Application March 9, 1955, Serial No. 500,225

13 Claims. (Cl. 92—6)

This invention relates to the production of pulp from bagasse and the like and comprises an improved process characterized by the addition of pith and very short fibrovascular fibers to whole bagasse or to relatively pith-free sclerenchymatous fibers in producing pulps for use in the manufacture of paper and paperboard. Its primary purpose is the utilization of such pith and short fibers in proportions greater than have heretofore been practical, and the use of substantially fiber-free bagasse pith (or pith from other plants of the family Gramineae) as a filler in paper making.

Sugar cane bagasse and the stalks and leaves of many other plants useful as raw material for paper and board pulps contain three important classes of cells. The stalks and leaf-stems of most such plants are roughly cylindrical, their outer sheaths being tough and composed very largely of long, narrow sclerenchymatous cells which constitute the most valuable part of the plant for paper making. Attached to this outer sheaf, and more or less filling the area within it, is a mixture of pith and relatively short fibrovascular cells, generally known collectively as parenchyma. Hereinafter I shall use the terms "sclerenchymatous" and "long-fibered" synonymously as referring to the relatively long cells of the outer sheath of pineapple and palm leaves, of plants of the family Gramineae and of other plants which may be treated by the process of the present invention; and I shall use "parenchyma" and "parenchymatous" to refer collectively to both the pith and the short-fibered fibrovascular cells enclosed within the stalks and leaves of such plants.

The parenchymatous cells, having a much greater surface-to-bulk ratio than do the longer sclerenchymatous cells, are much more readily attacked by chemicals used in producing pulp from such plants and consume disproportionately large quantities of the chemicals. Moreover, because of their small size, a large portion of these parenchymatous cells, having been both weakened and made smaller by the cooking process, are washed out of the pulp and lost during subsequent washing, refining and paper making operations. Still further, the cells of the parenchyma, because of their size, shape, composition and the damage they suffer during cooking, are very readily and progressively hydrated throughout the cooking and refining processes and are therefore very "slow" on the paper machine.

For the above reasons, the parenchyma is generally considered unsuitable for paper making and it is common practice to remove the parenchymatous materials from bagasse before cooking the more valuable fiber of the sheath areas. Such separation and removal is, however, expensive and considerably lessens the quantity of pulp which can be produced from a given weight of bagasse.

I have discovered that the pith and short fibrovascular fibers of bagasse parenchyma can be prepared for paper making with the use of little or no digestive chemicals, and that when so prepared and mixed with pulp from either whole bagasse of from relatively pith-free sheath fibers the parenchymatous material actually increases the yield, opacity and softness of the pulp to which it is added and at the same time increases the freeness of the pulp and therefore the speed at which it can be run on a paper machine. I have further discovered that bagasse pith, cleaned and bleached but not digested, is particularly valuable when added as a filler to previously refined chemical pulp in the preparation of printing paper furnishes.

In using the term "digested" herein I refer to materials which have been acted upon by digestive solutions normally used in the paper industry for cooking fibrous materials such as soda, sulfite or sulfate liquors conventionally used, and I exclude from the meaning of "digested" and "cooked" as used herein treatment by either or both steam and bleaches unaccompanied by such digestive solutions.

I have further discovered that if parenchymatous material is to be used for the purposes of this invention it should preferably be thoroughly deaerated, with a minimum of hydration, before going to the paper machine. This deaeration I prefer to accomplish by steaming or by treatment in water or a very weak black liquor (spent digestant solution) without substantial digestion or other degradation of the parenchymatous material.

Pith cells, because of their relatively great surface-to-bulk ratio, are greedy for chemical during digestion and for that reason are acted upon with disproportionate severity if cooked along with the fibrous cells of either the parenchyma or sheath fractions of the bagasse. The same is true to a somewhat lesser extent with the short fibrovascular fiber as compared to the longer sheath fiber. Hence, the sheath fibers require the most cooking, the fibrovascular material should be cooked less severely, and the pith should be cooked with only a very slight amount of chemical or should be rendered air-free and used without treatment by any chemical digestant at all. In fact, for low-grade pulps, especially those which are to be dyed, the pith can best be used without chemical digestion, or even steaming, merely being thoroughly water-logged in any desirable manner (but not "hydrated" in the paper making sense) before being mixed with long-fibered pulp and going to the paper machine.

Broadly, a principal objective of my present invention is to provide for extraordinarily efficient production of a single pulp from two or more chemically or physically dissimilar raw materials by simultaneously treating the said raw materials in the same vessel but for different lengths of time while the contents of the vessel is continuously maintained at superatmospheric pressure, then fractionating or breaking up the treated materials and intimately mixing them before exposure to atmospheric pressure. Examples of such dissimilar raw materials might be bamboo and sugar cane bagasse, different species of plants or trees, or the previously separated parenchymatous and sclerenchymatous fractions of sugar cane bagasse.

More specifically, when practiced in connection with the production of two differing fractions of sugar cane bagasse, the process of my invention consists in subjecting a predominantly sclerenchymatous fraction of bagasse to a progressive digestive cooking, preferably in a continuous cooker, and then adding a predominantly parenchymatous fraction to the partially cooked matter at a later stage as at a point nearer the discharge end of the same continuous cooker, so that the parenchymatous fraction is subjected to a shorter and therefore less intense cooking under the same pressure as the sclerenchymatous fraction and simultaneously therewith; and then forcibly fractionating and mixing the two fractions before either is exposed to atmospheric pressure. By this means digestive chemicals are conserved and over-digestion of the pith and weak parenchymatous fibers is prevented.

In a typical procedure bagasse is first separated into two fractions, one being predominantly long fibers and the other predominantly parenchymatous material, i. e. pith and fibrovascular cells. The long fibers are then reduced to a pulp to which the parenchymatous material is added at or near the terminal end of the digestion zone so that little or no digestion of the parenchyma occurs.

By this procedure the presence of parenchyma in paper pulp is made extremely advantageous, as compared with the disadvantages previously associated with its presence.

It will be apparent that when a variety of different classes of pulps are produced in one mill by the method of my present invention the parenchymatous raw material, either with or without classification as described above, may be added in any desired proportion to any type of pulp, or used in the same or a different mill as an addition to paper furnishes, or to the stock after it has been sheeted on the paper machine. Thus it is possible for a diversified pulp mill, using the present invention, to incorporate into its product a very large proportion of the whole bagasse which serves as raw material. The very substantial economic advantage of such more complete utilization of the bagasse is very considerable, and may well determine the commercial practicability of establishing a pulp mill in any given locality.

Illustrative examples of this invention, selected for purposes of illustration, are described in detail below.

Reference is made to the drawing which shows in elevational cross-section a continuous pressure cooker adapted for use in the process of this invention.

EXAMPLE I

Pulp or board stock

Bagasse from the sugar mill is first shredded and screened successively to yield two fractions, one being predominantly long fibered and of sclerenchymatous origin but generally including a small fraction of pith and short fibrovascular cells, and the other fraction consisting almost entirely of pith and short fibrovascular cells collected from beneath the screens.

The first fraction is thoroughly impregnated and coated with a solution of caustic soda of sufficient concentration to add to the bagasse fiber about 6% of its dry weight of caustic soda (as $Na_2O$) while bringing its moisture content to about 70% by weight. Typically, the solution will contain 65 grams per liter of NaOH, expressed as $Na_2O$. After impregnation with the caustic solution, the long fibered fraction is cooked to digest it to a stage where it may be pulped. The digester is conveniently a cylindrical continuous cooker such as shown in the drawing, consisting of a horizontal cylindrical casing 10, which is typically 30 feet in length, through which extends a screw conveyor 12. Steam may be introduced directly into the cooker through valved conduits 14 and 16 and the material to be cooked is introduced through one of several rotary valves 18, 20 or 22. At the discharge end, a discharge chute 24 connects with the bottom of the casing 10 and leads to a disk refiner 26 operating under cooking pressure. The discharge from the disk refiner 26 is through a pressure relief valve 28 connecting with a blow pipe 30 which carries the pulp for further processing. A typical disk refiner suitable for use in this invention is described in detail in U. S. Patent No. 2,145,851.

The long fibered fraction is conveniently introduced to the cooker through the inlet end rotary valve 18 while steam under a pressure of about 150 p. s. i. is introduced through the steam conduits 14 and 16. The speed of rotation of the screw conveyor 12 is adjusted to carry the material through the cooker in about 2 minutes and the digested fibers are then discharged to the refiner 26, where they are reduced to the desired degree of shive-freeness by appropriate adjustment of the refiner. From the refiner, the pulp passes through the pressure reduction valve 28 and out through the blow pipe 16. The yield from this fiber will be about 70%.

During the processing of the long-fibered material in the manner described above, the fraction of parenchymatous material recovered from below the screens, is further classified (as by dry screening, wet separation, or air flotation) into two approximately equal sub-fractions, one being predominantly fibrovascular cells, and the other consisting of at least about 90% by weight of pith.

The fibrovascular cells are introduced to the cooker through the intermediate rotary valve 20 where they are immediately mixed with and acted upon by some of the black liquor resulting from the digestion of the long-fibered fraction and the condensation of steam within the cooker. These cells are thus mixed with the long-fibered fraction and partially digested by the action of the black liquor in the cooker. Digestion of the fibrovascular cells, however, is extremely slight by virtue of the limited time they are in the cooker (approximately one minute) and the low active caustic concentration of the black liquor at this stage of the process. In addition, the fibrovascular cells are not preliminarily impregnated with digestive solution, and form what might be designated a "semi-chemical" pulp fraction, the yield of which is extremely high, generally above 80%.

The pith fraction is fed into the cooker near the discharge end through the last rotary valve 22 of the series after having been thoroughly wetted with water or other non-digestive material to a moisture content of between about 60 and 80%. The pith remains in the cooker for only about ½ minute and the action on the pith within the cooker is primarily softening and deaeration by the steam. In this stage of the process almost all of the black liquor available will have been absorbed by the fibrovascular fraction introduced upstream and the caustic content of any remaining black liquor will have been fairly completely exhausted. Also, the high moisture content of the pith precludes its absorbing much, if any, liquid. At the discharge end of the cooker, the mixture of digested long fibers, semi-digested fibrovascular cells and softened deaerated pith is discharged to the refiner 26 for completion of the pulping operation.

Since the pith under the above circumstances, will not be substantially hydrated, since board and corrugating pulps may permissibly contain a small percentage of shives, and since all three elements of pulp made and described above will have passed through the refiner 26 while in a plastic condition under great heat and pressure, the compounded pulp will need little additional refining and will, therefore, be unusually "free" and fast on the board or paper machine.

In comparison with conventional processes of utilizing bagasse in board and corrugating pulps, the result of the present invention as described in Example 1 above is a yield of dry pulp of about 75–80% with a chemical consumption of only about 7.6% of the pulp produced. On the other hand, in conventional bagasse pulping processes using depithed bagasse, the pulp yield is only about 70% of the depithed product, which is itself only about 60% of the whole bagasse, or about 42% based on whole bagasse, and the chemical consumption is about 14% of the pulp produced.

EXAMPLE II

Soft, relatively opaque printing paper

Whole bagasse from the sugar mill is repeatedly shredded and screened to produce equal fractions, one being the fiber bundles with about 5 to 20% of their weight being attached pith cells, and the other being the remaining pith and fibrovascular cells. The first fraction is violently agitated in a bath of spent black liquor at a temperature of about 60° C., so as to fractionate some of the long-fibered bundles and free them of additional pith and to remove water-soluble material and other extraneous inorganic matter. The washed fibers are then collected and pressed to a moisture content of about 60% or less and the pressed fibers are then impregnated with a caustic soda solution in an amount and of a concentration such that the impregnated fiber has a moisture content of about 70% by weight and a caustic content (expressed as $Na_2O$), of about 12% of the dry weight of the fiber. The impregnated fibers are introduced into the cooker through the rotary valve 18 with the conveyor speed adjusted for a 4 minute treatment period and the steam pressure at 125 p. s. i.

During this processing of the long-fibered fraction, the second fraction is further classified to yield a pith subfraction of about 98% pith content, which in an amount of about 38% of the dry weight of the first fraction, is introduced continuously into the cooker through the rotary valve 22. The pith thus introduced immediately absorbs and is reacted upon by the small amount of free black liquor in the cooker at this point, which because of its high initial alkali concentration will still contain considerable unreacted active alkali. The pith, however, remains in the cooker for only about 1¾ minutes before passing to the refiner 26 with the digested fiber fraction, and the action on the pith is primarily deaeration and fractionation with mild digestion. The pulp from the refiner 26 after washing, bleaching and further refining, produces a high quality printing paper which is softer, less dense, and more opaque than is now generally produced from bagasse, and the pulp is remarkably free on the paper machine.

EXAMPLE III

Semibleached—newsprint substitute

Whole bagasse from a paper mill is first shredded and screened repeatedly until the long fiber fraction retained on the screens contains less than 20% by weight of pith, and is then impregnated with a solution of sodium hydroxide of concentration and in an amount such that the moisture content of the fibrous material is about 70% by weight and the alkali concentration, expressed as $Na_2O$, is between about 6 and 12% based on the weight of dry fiber. The impregnated fiber is then introduced into the cooker 10 through the inlet end rotary valve 18 with the screw conveyor 12 adjusted to carry the material through the cooker in about 6 minutes. The cooker is fed with steam at a pressure of about 150 p. s. i.

Meanwhile the parenchymatous fraction separated from the long fibers is further classified into pith and a pith-free fraction, and the latter in an amount of about one-half the dry weight of the long fibers, is introduced continuously through the central rotary valve 20 after wetting to a moisture content of at least 50% by weight. The long fibers and short fibers are thus processed together, with the short fibers being treated under milder conditions by virtue of their introduction at the center of the cooker where the efficacy of the black liquor is greatly reduced, and by virtue of their having been previously wetted with water, whereby absorption of black liquor proceeds at a slower rate. After leaving the cooker, the fibrous fractions together pass through the refiner where they are converted to a pulp which while of excellent quality is extremely dense, transparent, and generally too slow for use as newsprint.

The pulp is then washed, bleached, and beaten to a Schopper-Riegler freeness of about 550 cc. and to it is then added between about 5 and 20% by weight (dry basis) of the separated pith fraction which has previously been bleached and washed, but not cooked in any way. The addition of the pith markedly increases the freeness, speed, capacity, softness and printability of the resulting paper and in addition, acts as a filler and replaces to a considerable degree, the filler formerly added to newsprint papers.

EXAMPLE IV

Pulping at atmospheric pressure

Bagasse, straw, corn stalks, and other fibrous materials may frequently be pulped by agitating in a hot digestant solution at atmospheric pressure, as is well known in the art. The present invention may be applied to such processes by adding pith to the pulping mixture shortly before the completion of the pulping operation. For instance, in a process of pulping depithed bagasse fibers, pulping is carried out by violently agitating the fiber in a 5–15% slurry in a caustic soda solution containing 20 grams per liter of sodium hydroxide expressed as $Na_2O$ in a Hydrapulper for about 40 minutes. The improved results of this invention may be obtained by adding to the Hydrapulper about 5 minutes before the pulp is removed, an amount of nearly pure, wetted pith equal to from 5 to 50% by weight (dry basis) of the fiber cells in the batch. A pulp so produced is of greatly improved quality, as well as quantity.

EXAMPLE V

Addition of bagasse pith to pulp from plants other than sugarcane

The freshness of pulps other than bagasse pulp can also be increased by the addition of bagasse pith to the pulp. In many localities, other plants suitable as sources for pulps are grown near to cane sugar mills, making it possible to base paper making operations on the by-products of, for instance, pineapples and sugar refining. Pineapple plants, either the whole plants or the leaves alone, may be pulped by any of several methods, but paper furnishes prepared from them are stiff, dense, and slow and are difficult to to run on standard paper or board machines. By the present invention, however, wetted, but not digested or cooked bagasse pith, may be added to the paper stock to improve its quality. For instance, a pineapple pulp having a freeness of 450 cc. (Schopper-Riegler) may be greatly improved by adding raw bagasse pith in an amount of 45% by weight (dry basis) of the dry pineapple pulp in the furnish. The resulting pulp with the added pith will have a freeness of about 700 cc. and the pulp may be run on standard paper and board machinery with greatly improved results particularly respecting the softness, porosity, absorbent quality and strength of the paper.

EXAMPLE VI

Soft, low-density pulp from alkali-impregnated stored fiber

In the preparation of pulp from alkali-impregnated stored fiber as disclosed in applicant's copending application, Ser. No. 443,959, filed July 16, 1954, the bagasse is stored for a period of time, generally several months, after having been impregnated with an aqueous solution of sodium hydroxide or other alkali, during which time a considerable degree of digestion takes place. After the bagasse has been stored, it may readily be pulped, conveniently by first passing it through a bale-breaker to expand the fibers after the compression of storage, and then impregnating the bagasse with an alkali solution in an amount and of a concentration such that the moisture content of the bagasse is brought to about 70% by weight and the alkali concentration to about 1–8% based on the dry weight of the fiber. The impregnated fiber is then fed through a cooker such as shown in the drawing, and treated under a steam pressure of 125 p. s. i. for about 2 minutes, and is then passed through the refiner 26 and then out through valve 28.

Although the pulp thus produced is of good quality, the addition of pith will increase its freeness and result in a softer, less dense and more opaque paper. A suitable technique consists in feeding into the cooker through the rotary valve 22 about 5% based on the dry weight of the fiber of pith which will remain in the cooker for about 1 minute. After the pulp from the refiner has been washed and beaten to a freeness of 500 cc. (Schopper-Riegler), 15% based on the dry weight of the fiber of substantially pure pith is thoroughly wetted and added to the pulp. The addition of the pith increases the freeness to about 650 cc. and the furnish may then be run immediately on the paper machine.

Having thus disclosed my invention and described in detail illustrative examples of its practice, I claim as new and desire to secure by Letters Patent:

1. The process of making pulp from plants of the family Gramineae comprising separating the plants into at least two fractions, one fraction consisting predominantly of long sclerenchymatous fiber bundles and the other fraction consisting predominantly of parenchymatous material, contacting the sclerenchymatous fraction with a digestant solution under digesting conditions and then adding the parenchymatous fraction after the sclerenchymatous fraction has been partially digested, whereby the parenchymatous fraction is subjected to a differential, less intense cooking under the same pressure and in the same vessel as the sclerenchymatous fraction and simultaneously therewith.

2. The process defined by claim 1 wherein digestion is carried out under steam pressure in a chamber to which both fractions are added, with the one fraction remaining in the chamber longer than the other fraction.

3. The process defined by claim 1 wherein the mixture of digested material is refined by mechanical comminuting means at substantially digestion temperature and pressure.

4. In a process for continuously producing a pulp blended from two raw materials, one predominantly sclerenchymatous and the other predominantly parenchymatous in character, the steps of continuously and simultaneously advancing both materials through the same pressure chamber while exposing each of said materials to the same superatmospheric vapor pressure but for time periods longer in the case of the sclerenchymatous material than in the case of the mixed sclerenchymatous and parenchymatous materials and during the said time periods subjecting the materials to chemical digestant solution of progressively weaker strength, and thoroughly mixing both the materials together in the latter period of treatment while still at superatmospheric pressure.

5. The process defined in claim 4 wherein the parenchymatous material is steamed before being added to the digested sclerenchymatous matter.

6. The process defined by claim 4 wherein the parenchymatous material is washed with a digestant solution before being added to the digesting sclerenchymatous matter.

7. The process defined by claim 4 wherein the parenchymatous material is contacted with black liquor before being added to the digesting sclerenchymatous matter.

8. The process defined by claim 4 wherein the parenchymatous material is treated with a bleaching agent before being added to the digesting sclerenchymatous matter.

9. In a process of continuously producing a pulp blended from three raw materials, one predominantly long fibers, one predominantly fibrovascular cells, and the third being predominantly pith, the steps of advancing the long fiber material through an elongated digesting zone and subjecting it therein to steam pressure and progressively weaker digestant solution, introducing the fibrovascular material into the digesting zone at an intermediate point after the long fiber material has been partially digested, introducing the pith into the digesting zone adjacent the terminal end thereof, mixing all three materials and digesting them as a mixture while advancing it through a short terminal portion only of the digesting zone.

10. In a process of continuously producing a pulp blended from two bagasse fractions, one predominantly long fibered and the other comprising pith, the steps of advancing the long fiber fraction through an elongated digesting zone and subjecting it therein to steam pressure and progressively weaker digestant solution, introducing the pith fraction at an intermediate point after the long fiber fraction has been partially digested, mixing the two fractions and digesting them as a mixture while advancing it through a short terminal portion only of the digesting zone.

11. The process of claim 10 in which the pith fraction remains as a mixture with the long fiber fraction under steam pressure in the digesting zone only about one-half minute.

12. The process of claim 10 in which the pith fraction is wetted to a moisture content of 60 to 80% before being introduced into the digesting zone, thereby reducing the amount of digestant solution absorbed by the pith.

13. The process of claim 10 in which the pith is agitated in a bath of spent black liquor at a temperature of about 60° C. before being introduced into the digesting zone.

References Cited in the file of this patent

UNITED STATES PATENTS

| | | |
|---|---|---|
| 622,054 | Marsden | Mar. 28, 1899 |
| 720,850 | Sherwood | Feb. 17, 1903 |
| 720,851 | Sherwood | Feb. 17, 1903 |
| 789,418 | Drewsen | May 9, 1905 |
| 811,419 | Manns | Jan. 30, 1906 |
| 1,754,413 | Brookby | Apr. 15, 1930 |
| 1,755,781 | Hinde | Apr. 22, 1930 |
| 1,782,755 | Williams | Nov. 25, 1930 |
| 1,790,002 | Darling | Jan. 27, 1931 |
| 1,809,427 | Spohn | June 9, 1931 |
| 1,854,557 | Munroe et al. | Apr. 19, 1932 |
| 1,982,130 | Wollenberg | Nov. 27, 1932 |
| 2,029,973 | Wells | Feb. 4, 1936 |
| 2,296,524 | Heritage | Sept. 22, 1942 |

FOREIGN PATENTS

| | | |
|---|---|---|
| 153,410 | Australia | Nov. 9, 1950 |

UNITED STATES PATENT OFFICE
CERTIFICATE OF CORRECTION

December 2, 1958

Patent No. 2,862,814

Clarence Birdseye

It is hereby certified that error appears in the printed specification of the above numbered patent requiring correction and that the said Letters Patent should read as corrected below.

Column 5, line 75, for "capacity" read -- opacity --; column 6, line 28, for "freshness" read -- freeness --.

Signed and sealed this 5th day of May 1959.

(SEAL)
Attest:

KARL H. AXLINE
Attesting Officer

ROBERT C. WATSON
Commissioner of Patents